(12) United States Patent
Harris et al.

(10) Patent No.: US 10,441,949 B2
(45) Date of Patent: Oct. 15, 2019

(54) METHOD AND APPARATUS FOR COATING A CARRIER

(75) Inventors: Michael Harris, Summerstrand (ZA); Dieter Detterbeck, Linsengericht (DE); Egbert Lox, Hochwaldhausen (DE); Thomas Kreuzer, Karben (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 2213 days.

(21) Appl. No.: 10/553,359

(22) PCT Filed: Apr. 16, 2004

(86) PCT No.: PCT/EP2004/004074
§ 371 (c)(1),
(2), (4) Date: Feb. 4, 2008

(87) PCT Pub. No.: WO2004/091786
PCT Pub. Date: Oct. 28, 2004

(65) Prior Publication Data
US 2008/0118628 A1    May 22, 2008

(30) Foreign Application Priority Data
Apr. 17, 2003  (DE) ................. 103 17 885

(51) Int. Cl.
*B01J 35/04* (2006.01)
*B01J 37/02* (2006.01)
*B05D 3/04* (2006.01)
*B05D 7/22* (2006.01)

(52) U.S. Cl.
CPC .......... *B01J 35/04* (2013.01); *B01J 37/0215* (2013.01); *B05D 3/0493* (2013.01); *B05D 7/22* (2013.01)

(58) Field of Classification Search
USPC ................................... 427/8, 235
See application file for complete search history.

(56) References Cited

U.S. PATENT DOCUMENTS

| | | | |
|---|---|---|---|
| 3,959,520 A | 5/1976 | Hoyer et al. | |
| 4,066,801 A | 1/1978 | Hoyer et al. | |

(Continued)

FOREIGN PATENT DOCUMENTS

| | | |
|---|---|---|
| CN | 1233533 | 11/1999 |
| DE | 19822505 | 11/1999 |

(Continued)

OTHER PUBLICATIONS

International Search Report.

(Continued)

*Primary Examiner* — Nathan H Empie
(74) *Attorney, Agent, or Firm* — Smith, Gambrell & Russell, LLP

(57) ABSTRACT

This invention relates to a method and a corresponding apparatus for coating open-pored bodies with at least one coating suspension. In particular, the coating suspension has solids and solutes in a liquid medium in a quantity in wet state which is to correspond to at least a required target quantity. The coating operation has a variation in the applied wet coating quantity from one body to the other. The method according to the invention is characterized by the steps of: coating the body with an actual quantity of the coating suspension, which is always larger than the required target quantity taking the variation of the coating operation into account, determining the difference between the actual quantity and the required target quantity, and reducing the difference between actual quantity and target quantity by removing still wet coating suspension.

25 Claims, 2 Drawing Sheets

(56) References Cited

U.S. PATENT DOCUMENTS

| | | | |
|---|---|---|---|
| 4,208,454 A * | 6/1980 | Reed et al. | 427/238 |
| 5,165,970 A | 11/1992 | Schmidt et al. | |
| 5,182,140 A * | 1/1993 | Watanabe | B01J 35/04 |
| | | | 427/230 |
| 6,149,973 A | 11/2000 | Foerster et al. | |
| 6,487,869 B1 * | 12/2002 | Sulc et al. | 62/230 |
| 6,534,113 B1 | 3/2003 | Ueberschar et al. | |
| 6,548,105 B2 | 4/2003 | Kiessling et al. | |
| 6,594,542 B1 * | 7/2003 | Williams | 700/164 |
| 6,746,716 B2 | 6/2004 | Kiessling et al. | |
| 2001/0024686 A1 * | 9/2001 | Kiessling et al. | 427/235 |
| 2003/0044520 A1 * | 3/2003 | Kiessling et al. | 427/79 |
| 2009/0130294 A1 | 5/2009 | Fehnle et al. | |

FOREIGN PATENT DOCUMENTS

| | | |
|---|---|---|
| EP | 1 136 462 | 9/2001 |
| EP | 1273344 | 1/2003 |
| EP | 1 319 436 | 6/2003 |
| EP | 1 486 248 | 12/2004 |
| EP | 1 570 892 | 9/2005 |
| JP | H06-122576 | 5/1994 |
| JP | 2000-202342 | 7/2000 |
| WO | 2004/052501 | 6/2004 |
| WO | 2004/091786 | 10/2004 |

OTHER PUBLICATIONS

Kolb, et al. "The Ins and Outs of Coating Monolithic Structures" Improve your understanding of coating catalytic support materials; Chemical Engineering Progress; vol. 89 Feb. 1993; No. 2; pp. 61-67.

Chinese Office Action relative to Chinese Patent Application Serial No. CN 201310018708.5, dated Oct. 15, 2014 (with English translation).

International Preliminary Report on Patentability for PCT/EP2004/004074 dated Oct. 17, 2005 (7 pages).

* cited by examiner

METHOD AND APPARATUS FOR COATING A CARRIER

BACKGROUND OF THE INVENTION

This invention relates to a method for coating a carrier with a coating suspension. More particularly, this invention relates to a method and an apparatus for coating carriers for catalysts, for example automotive exhaust-gas catalysts.

As a rule, the carriers for automotive exhaust-gas catalysts are of a cylindrical shape with two faces and a shell surface, and a large number of flow ducts for the exhaust gases of the internal combustion engines extend from the first face to the second face essentially in parallel to the cylinder axis. These carriers are also referred to as honeycomb carriers.

The cross-sectional shape of the carriers depends on the installation requirements in the motor vehicle. Carriers having a round cross-section, an elliptical or triangular cross-section are widely used. The flow ducts mostly include a square cross-section and are arranged in a closely packed grid pattern over the entire cross-section of the carriers. Depending on the application, the duct or cell density of the flow ducts varies between 10 and 140 $cm^{-2}$. Honeycomb carriers having cell densities of up to 250 $cm^{-2}$ are being developed.

For purifying automotive exhaust gases, catalyst carriers obtained by extruding ceramic bodies are mainly used. Alternatively, catalyst carriers made of corrugated and wound metal foils are available. For purifying passenger car exhaust gases, ceramic carriers having cell densities of 62 $cm^{-2}$ are still being used predominantly. The cross-sectional dimensions of the flow ducts are 1.27×1.27 $mm^2$ in this case. Wall thicknesses of such carriers range between 0.1 and 0.2 mm.

In order to convert the pollutants contained in automotive exhaust gases, such as carbon monoxide, hydrocarbons and nitrogen oxides, into harmless compounds, very finely divided metals of the platinum group are typically used, the catalytic effect of which may be altered by compounds of non-noble metals. These catalytically active components must be deposited onto the carriers. However, it is impossible to guarantee the required very fine dispersion of the catalytically active components by depositing these components onto the geometrical surfaces of the carriers. This applies equally to the non-porous metallic and porous ceramic carriers. A sufficiently large surface for the catalytically active components may be provided only by applying a support layer of finely divided (i.e. in powder form), high-surface area materials onto the internal surfaces of the flow ducts. In the following, this operation is referred to as coating of the carrier. Coating the shell surface of the carriers is not desired and should be avoided in order to prevent loss of valuable catalytically active materials.

A suspension of the finely divided, high-surface area materials in a liquid phase, normally water, is used for coating the carriers. As high-surface area support materials for the catalytically active components, typical coating suspensions for catalytic applications include, for example, aluminum oxides, aluminum silicates, zeolites, silicon dioxide, titanium oxide, zirconium oxide and oxygen-storing components on the basis of cerium oxide. These materials constitute the solids content of the coating suspension. In addition, soluble precursors of promoters or catalytically active noble metals of the platinum group in the periodic table may also be added to the coating suspension. The solids concentration of typical coating suspensions ranges between 20 and 65 wt.-% based on the total weight of the suspension. They exhibit densities between 1.1 and 1.8 kg/l.

According to the prior art, various methods for depositing the support layer onto the carriers using the coating suspension or slurry are known. In order to coat the carriers, they may be dipped into the coating suspension or coated by pouring the coating suspension over them. It is also possible to pump or suck the coating suspension into the ducts of the carriers.

In any case, surplus coating material must be removed from the ducts of the carriers by suction or by blowing-off with compressed air. This will also open ducts which may have become blocked by coating suspension.

After coating, the carrier and the support layer are dried and then calcined in order to solidify the support layer and fix it to the carrier. Subsequently, the catalytically active components are introduced into the coating by impregnation, using mostly aqueous solutions of precursor compounds of the catalytically active components. As an alternative, the catalytically active components may already be added to the coating suspension itself. In this case, subsequent impregnation of the completed support layer with the catalytically active components may be omitted.

An essential criterion of the coating methods is the coating or loading concentration which can be achieved in a single run using these methods. This signifies the solids content left on the carrier following drying and calcination. The coating concentration is indicated in grams per liter of volume of the carriers (g/l). In practice, coating concentrations of up to 300 g/l are needed for automotive exhaust-gas catalysts. If the method used is incapable of applying this quantity in a single run, the coating operation, following drying and, if necessary, calcination of the carrier, must be repeated until the desired loading is achieved. Frequently, two or more coating operations using coating suspensions of different compositions are performed. As a result, catalysts are obtained which include several layers stacked on top of each other and having different catalytic functions.

DE 40 40 150 C2 describes a method in which catalyst carriers having a honeycomb shape may be coated uniformly with a support layer and a catalytically active layer, respectively, over their entire lengths. Below, catalyst carriers will also be referred to as honeycomb carriers. According to the method described in DE 40 40 150 C2, the cylinder axis of the honeycomb carrier is aligned vertically for coating. Then, the coating suspension is pumped into the ducts through the lower face of the honeycomb carrier until it emerges at the upper face. After that, the coating suspension is pumped down again, and surplus coating suspension is blown or sucked out of the ducts in order to prevent the ducts from becoming blocked. This method produces support layers which exhibit good uniformity over the entire length of the honeycomb carriers.

The coating method described above includes a certain variation in coating quantities from one carrier to the other. This variation depends on the nature of the coating suspension and on the characteristics of the honeycomb carriers to be coated, such as their porosity, for example.

SUMMARY OF THE INVENTION

The object of the present invention is to provide an improved method and an improved apparatus for coating carriers, especially carriers for catalysts, with a coating suspension, which enable the variation in coating quantities to be reduced.

This object is solved with the features according to the claims.

Before describing the invention in detail, a number of terms will be explained below.

In the following, the term "bodies" means inert carriers for catalytically active coatings.

As used below, wet uptake or wet coating quantity describes the quantity of coating suspension remaining on the carriers after coating and before a possible drying operation. It may be determined by weighing the carrier before and after coating.

By contrast, dry uptake is the quantity of coating material present on the carriers following drying and calcination.

In the following, target quantity means the wet uptake which is absolutely necessary in order to achieve the required catalytic activity and which no coated carrier must fall short of.

This invention relates to a method and a corresponding apparatus for coating open-pored bodies with at least one coating suspension. The coating suspension includes solids and solutes in a liquid medium. Coating is performed using a quantity in wet state which is to correspond to at least a required target quantity. The coating operation has a variation in the applied wet coating quantity from one body to the other. The method according to the invention is characterized by the steps of:

a) coating a body with an actual quantity of the coating suspension which is always greater than the required target quantity taking the variation of the coating operation into account, b) determining the difference between the actual quantity and the required target quantity, and c) reducing the difference between the actual quantity and the target quantity by removing still wet coating suspension.

The method is suitable for coating carriers made of metal or ceramics. The carriers may be present in the shape of so-called honeycomb carriers having parallel flow ducts open on both sides or may comprise an open-pored foam or fiber structure. However, the method can also be used to coat so-called wall flow filters.

DETAILED DESCRIPTION OF THE PREFERRED EMBODIMENTS

The following explanation of the invention is based on carriers having parallel flow ducts which are employed in large numbers as carriers for catalysts in order to purify the exhaust gases of internal combustion engines.

Coating of the carriers is carried out in a so-called coating station. According to the prior art, a wide variety of examples are known. The description is based on an exemplary coating station, such as that described in the publications DE 40 40 150 A1, EP 0941763 A1, EP 1136462 A1 and EP 1273344 A1, for example.

For coating, the carriers are placed on the coating station and filled with the coating suspension from below by means of a pump or from a pressurized reservoir. After that, surplus coating suspension is either pumped out of the carrier or sucked out by applying a vacuum. Flow ducts which may have become blocked by coating suspension may then be blown free using compressed air, for example.

The resulting coating of the carrier will be referred to as raw coating below. The coating quantity of the raw coating depends on the solids concentration of the coating suspension, its viscosity and the coating conditions, especially the conditions when removing the surplus coating suspension from the flow ducts of the carriers. Persons skilled in the art are familiar with these relationships and can define the mean value of the actual coating quantity taking the variation of this coating process into account so that no carrier will fall short of the target quantity.

The variation of this conventional coating process depends on the type of coating suspension and other parameters of the coating process. Usually, the variation is ±5% to ±10%. Favorably, it may be reduced down to ±2%.

In order to decrease the variation of this conventional coating process, the invention provides for a re-suction operation of the still wet coating suspension from one end of the carrier so as to match the actual coating quantity with the desired target quantity. Here, intensity and/or duration of re-suction are adjusted in accordance with the determined differential quantity or surplus. Instead of re-suction also blowing with compressed air can be used to adjust the remaining coating quantity on the carrier.

Adjustment of intensity and/or duration of re-suction may, for example, be done by selecting the corresponding values from tables of values for the measured actual quantity which were established in preliminary tests. Alternatively, intensity and/or duration of re-suction may be controlled in accordance with the values for the actual quantity determined on the bodies coated immediately before, intensity and/or duration of re-suction and the thus achieved reduction in the difference between actual and target quantities, that is, depending on incoming weight or deviation from the required target quantity, re-suction is adjusted in a predictive manner such that the actual quantity approximates the target weight or target coating quantity in the carrier as far as possible.

Following re-suction, the coating quantity is preferably determined again by weighing, and re-suction is repeated until the actual coating quantity is within specifications.

Thus, according to the invention, a conventional coating method is used to apply a raw coating onto the carrier. This is followed by re-suction during which any surplus coating suspension (based on a target value or the target quantity) is sucked off.

Depending on the variation in the raw coating, the target value for the coating concentration (mean value of the actual coating quantities) is increased to such an extent that all carriers, including those having a minimal loading, will still be within specifications. If, for example, the variation in the raw coating is ±5%, all carriers will be coated using a mean value of the actual coating quantities of 105%. This ensures that all parts are coated at 105±5% so that all carriers comprise at least the target coating quantity. Hence, the carriers are deliberately overloaded during raw coating. In this exemplary case, the mean value of the actual coating quantities is around 105% of the required target loading.

Then, the re-suction operation follows. During re-suction, the deliberate overload of coating suspension on the carriers is sucked off to the target quantity or close to it.

Any surplus between actual quantity and target quantity resulting from raw coating is preferably determined by weighing. It is particularly preferred to determine the actual quantity on coating suspension by weighing the or each carrier before and after coating and comparing the results. Preferably, the differential quantity which was actually removed is also determined by weighing. If the weight of the carriers designed for coating is sufficiently constant, weighing before coating may be omitted.

If the actual quantity is very close above the target quantity, there will be a risk that re-suction removes so much that the target quantity is not obtained. For that reason, it is advantageous to perform re-suction only if the difference between actual quantity and target quantity exceeds a previously specified threshold value.

The difference between incoming weight of the raw coating and target coating quantity is a criterion for adjusting the intensity of re-suction. The intensity of re-suction may be adjusted directly through the applied vacuum, or indirectly through an "air damper" or a throttle valve, an air infiltration valve or a calibrated leak in the exhaust line. As another control criterion, the duration of re-suction may be altered. Naturally, both parameters may be changed in a suitable combination in order to adjust the intensity of re-suction.

Preferably, however, a constant time period for re-suction within the range between 0.1 and 5 seconds, in particular between 0.5 and 2 seconds, is used and the intensity of re-suction is adjusted by changing the vacuum using a throttle valve, an air infiltration valve or a calibrated leak. In the simplest case, the intensity of re-suction is adjusted by a controller from previously determined characteristics including a list of the necessary adjustment parameters for the throttle valve etc. depending on the overload, i.e., the difference between incoming weight of the raw coating and target coating quantity.

As a rule, these characteristics depend on the composition of the coating suspension used and, accordingly, must be determined separately for each coating type (for example three-way catalyst for gasoline engines, diesel oxidation catalyst or nitrogen-oxide storage catalyst). Therefore, it may, for example, be useful to provide several air infiltration valves which are adapted in an optimum manner to the control range for various types of coating suspension and/or varying degrees of overload.

Particularly advantageous is the construction of a closed-loop control circuit comprising the carriers to be coated as a controlled system, the measured load as an actual value and the desired load as a target value. Using the deviation between actual values and target values, a controller determines manipulated variables for adjusting the throttle valve (or air infiltration valve etc.) serving as final control element. An increasing campaign duration results in a control function which is refined and improved in a self-learning fashion. Consequently, the adjustment of re-suction can be carried out for each successive carrier, if process parameters are otherwise constant. Depending on excess coating, the performance of re-suction is individually adjusted in advance for the specific part. The closed-loop control system independently evaluates the success of this action in order to adjust and improve the control parameters.

Thus, the coating of all carriers will be constrained within a specified tolerance window (e.g. ±1%) above the target quantity, which would be impossible using a single suction operation.

In particularly preferred embodiments, removal of the surplus or the differential quantity is carried out by iteratively removing a certain, relatively small quantity, weighing and, if necessary, repeating these steps. Thus, steps b) and c) of the method are performed at least twice until the actual quantity is within a previously specified tolerance interval above the target quantity. The specified threshold value may be reduced after each run in order to increase the precision for a renewed run.

During repetition of the above-mentioned steps, the relatively small quantities are preferably sucked from mutually opposite ends of the carrier. This is advantageous in that the uniformity of the coating is improved over the length of the ducts in the carrier. In order to suck the relatively small quantities from mutually opposite ends of the carrier, the carrier is turned 180 degrees each during re-suction, thereby applying its opposite ends to a suction station.

However, iterative re-suction poses the risk that the coating suspension solidifies with increasing iteration stages and that the coating is only increasingly dried by re-suction. This behavior may be compensated for by a corresponding control or closed-loop control program. It is, however, preferred to limit the number of re-suction operations to a maximum of 2 to 3.

After completion of re-suction, the coated carriers are dried at an elevated temperature between 80 and 200° C. for a time period of 5 minutes to 2 hours, and then are usually calcined at temperatures between 300 and 600° C. for a time period of 10 minutes to 5 hours. Calcination causes the coating to be strongly fixed to the carrier and converts any precursor compounds in the coating suspension into their final form.

The method presented provides excellent accuracy of, i.e. low variation in, the coating concentration when carriers are coated with catalytically active coatings. This increased accuracy is obtained by the re-suction operation according to the invention. Initially, this was surprising as there was a concern that re-suction would only remove the liquid phase of the coating suspension, but not a corresponding solids content, too. However, examinations carried out by the inventors proved that this was not true. The ratio of dry uptake to wet uptake changes only slightly as a result of re-suction.

Therefore, it is possible to shift the mean value of the actual coating quantities achieved with the method so as to be closer to the technically required target coating quantity. As a result, considerable savings of noble metal and valuable raw materials for the coating may be obtained. By contrast, in the conventional coating methods, the mean value of the actual coating quantities must be selected clearly higher than the technically required target coating quantity in order to safely prevent the coating quantity in some carriers from falling below the target value.

Use of this method for the fabrication of multiple layers on the carriers is of particular advantage. Here, the variations in the individual coatings add up, so that with the conventional methods, considerable variations in the final multilayer coating must be taken into account. By applying the method according to the invention to this coating problem, multilayer coatings having clearly reduced variations in the coating concentration may be fabricated.

BRIEF DESCRIPTION OF THE FIGURES

In the following, preferred exemplary embodiments of the apparatus and the method will be explained in detail with reference to FIGS. 1 and 2, wherein:

FIG. 1 shows the possible construction of a coating system suitable for the method. Preferably, the coating system comprises a coating station 20 for producing the raw coating. For this purpose, the carrier 1 to be coated is placed on the retaining elements provided for this purpose, cf. FIG. 1. By inflating an inflatable rubber gasket 21, the carrier 1 is fixed and sealed to the station. Further, a second sealing gasket 22 may be provided which is placed on the upper end of the carrier 1 in order to tightly fix an overflow 23. A level sensor 25 is preferably arranged above, which detects a sufficient filling level of the carrier 1 and sends a corresponding signal to the apparatus controller or closed-loop controller of the coating system.

In order to produce the raw coating, the coating suspension is pumped via the feed line 24 into the carrier from below until the level sensor indicates that a specified filling level has been reached. Afterwards, a suction or throttle valve 26 is opened to remove surplus coating suspension from the ducts of the carrier 1 by suction (pre-suction). To do so, a pipe is connected to a vacuum tank (not shown) and a demister. The vacuum tank is connected to a blower which maintains a vacuum, preferably between 50 and 500 and particularly preferably of 300 millibars below ambient pressure. Intensity and duration of pre-suction may be adjusted using the throttle valve 26. They determine the raw coating quantity left on the carrier. In addition, this operation serves to open ducts which may have become blocked by coating suspension.

Figure 1:
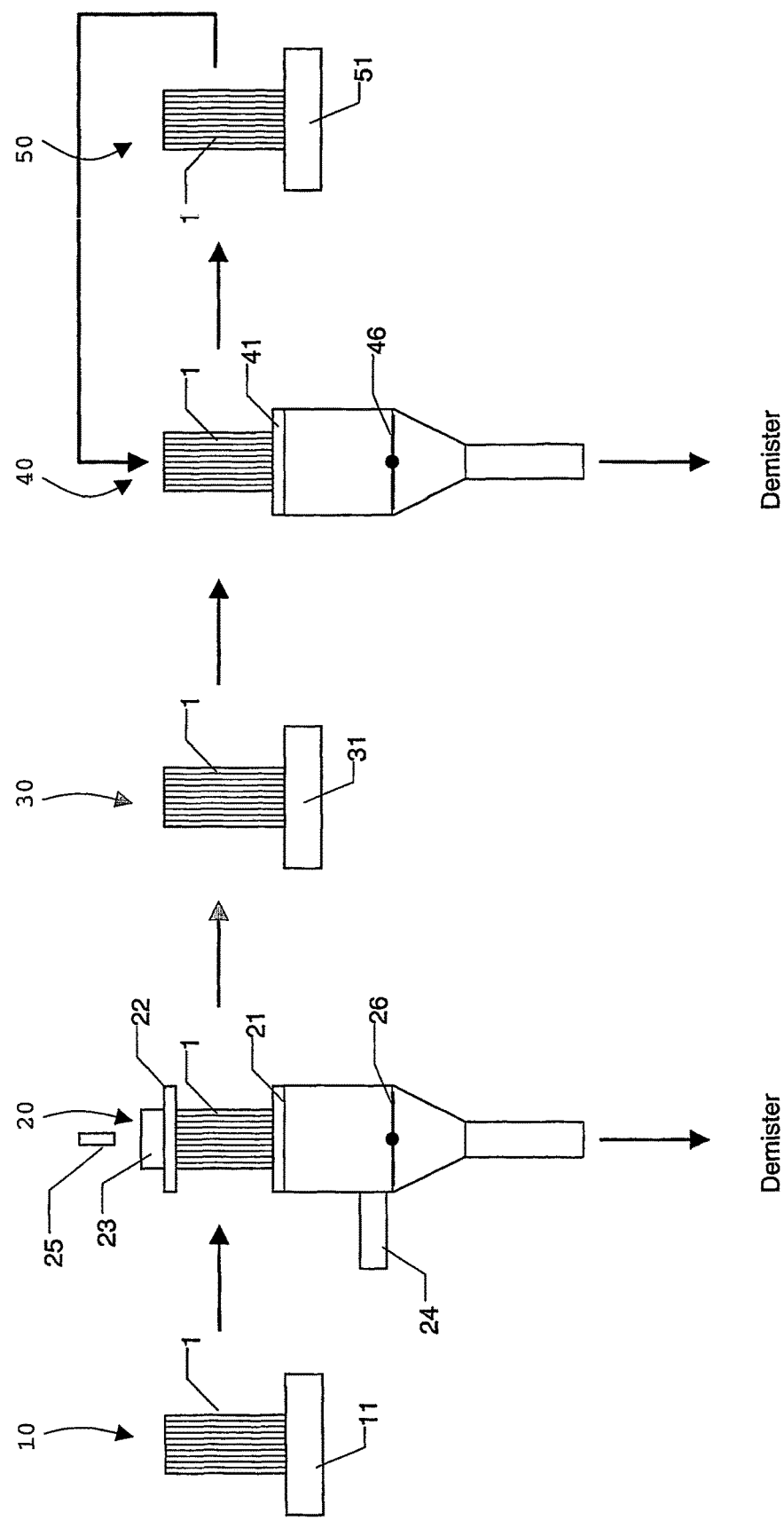
FIG. 1 is a schematic representation showing a preferred coating system for performing the method.

FIG. 1 also shows a weighing station 30 at which the coated carrier 1 is weighed on a balance 31. The quantity of coating suspension in the carrier 1 may be determined in this manner. In addition, a weighing station 10 having a balance 11 may be provided upstream of the coating station 20 so as to determine the weight of the carrier 1 prior to coating.

If it is found in the weighing station 30 that the loading of the carrier 1 with coating suspension is excessively high, the carrier is conveyed onto a re-suction station 40 which removes the excessively applied coating suspension. Similar to the coating station 20, the re-suction station 40 includes a sealing gasket 41 tightly fixing the carrier 1 to the re-suction station 40. A suction valve 46 is used to control the quantity of coating suspension sucked off. If, however, it is found in the weighing station that the applied coating quantity is already below the threshold value, then the carrier is transferred out of the coating system without any re-suction and supplied to a drying and calcining station (not shown).

Following re-suction, it is particularly preferred to weigh the carrier 1 again in the weighing station 30 or another weighing station 50 using a balance 51 as shown in FIG. 1. If, during this further check of the quantity of coating suspension in the carrier 1, it is found that there is still too much coating suspension in the carrier 1, the carrier may again be conveyed into the re-suction station 40. Otherwise, the carrier is transferred out of the coating station and supplied to the drying and calcining station.

As indicated before, the weighing stations 30 and 50 may be combined, depending on the desired flexibility and/or speed of the overall system. Moreover, the weighing station 30 and/or 50 may be combined with the re-suction station 40 or the coating station 20.

EXAMPLE

The coating system as shown in FIG. 1 was used to perform a coating campaign to coat 500 carriers.

Figure 2:
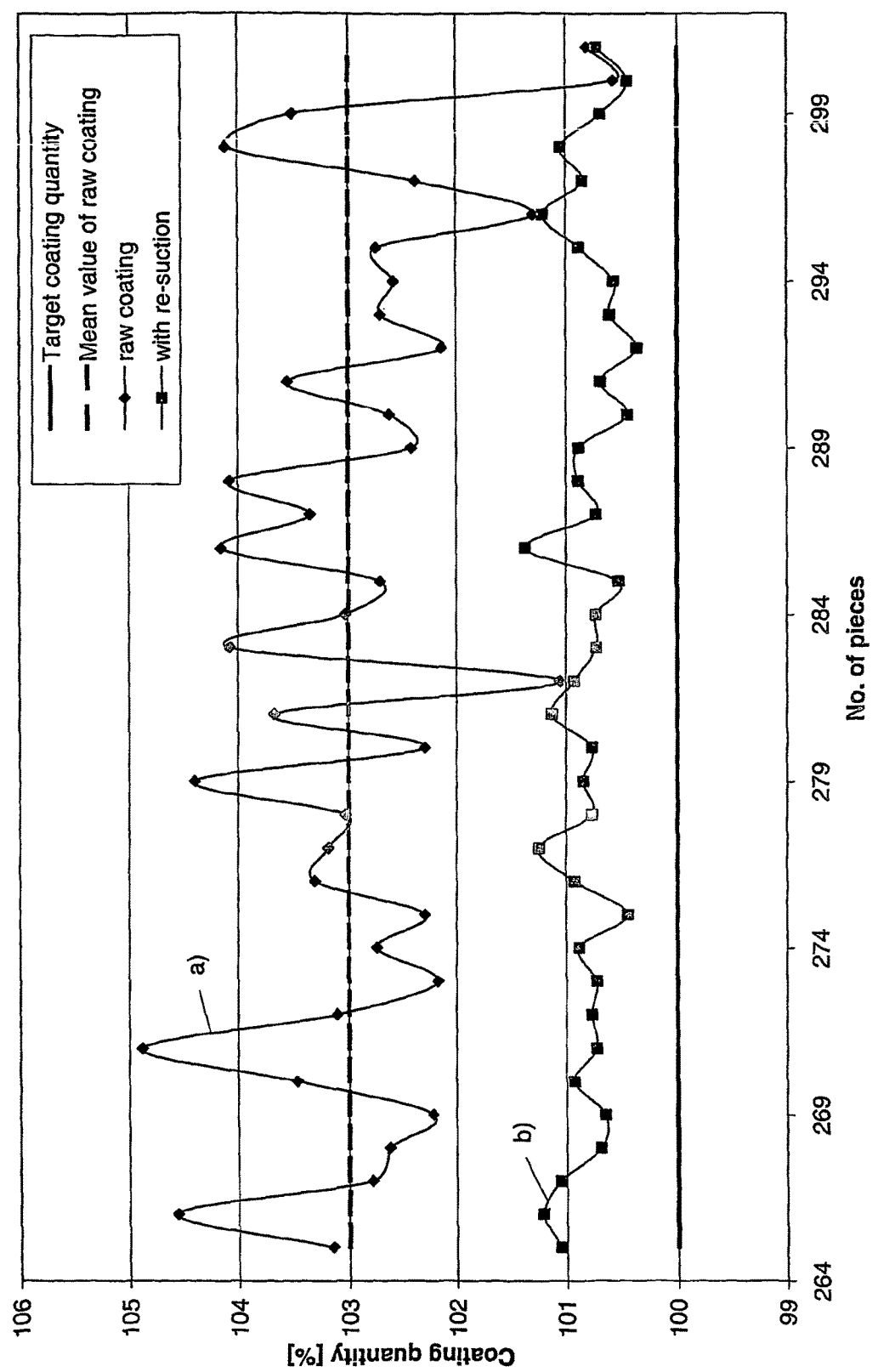
FIG. 2 is a diagram showing the coating quantities for a series of carriers when coated conventionally and when coated with the method according to the invention.

The diagram of FIG. 2 shows the coating results for 37 carriers. The coating number is indicated on the abscissa. The ordinate indicates the determined percentage coating quantity based on the desired target quantity (100%).

Curve a) represents the coating quantities of the raw coating as determined at the weighing station 30. The coating suspension used had a raw coating variation of ±3%. Accordingly, the mean value of the raw coating was set to 103% of the target coating quantity.

Curve b) shows the results after a single re-suction operation. The variation in the coating quantity could be reduced to ±0.5% by re-suction. The mean value of the coating quantities produced by re-suction was about 101% of the target quantity.

The coating suspension removed from the carriers by re-suction is collected and re-supplied to the coating process following a corresponding conditioning procedure. As a result, in this example the proposed method can save about 2% of noble metal cost and corresponding cost for the other coating materials.

What is claimed is:

1. A method for coating a plurality of ceramic honeycomb carrier bodies, comprising flow ducts or flow pores, with at least one coating suspension, wherein the coating suspension comprises solids in a liquid medium, in a quantity in a wet state that corresponds to at least a required target quantity, wherein the required target quantity is an amount necessary to coat the flow ducts or flow pores in order to achieve a target catalytic activity, and the coating operation includes a variation in an applied wet coating quantity from one body to the other, the method comprising, for each carrier body in a production run:
 (a) placing a raw coating onto a body at a coating station by
  (i) delivering a quantity of the coating suspension to the body at the coating station; and
  (ii) removing an amount of surplus coating suspension by pumping or suction to leave a quantity of wet coating suspension on the body in the form of a raw coating, the raw coating being present in a quantity that is larger than the required target quantity;
 (b) determining, after step (a)(ii) and prior to any further removal of coating suspension from the body, a differential quantity representing a difference between an actual quantity of the raw coating and the required target quantity, and
 (c) reducing the difference between the actual quantity of raw coating and the target quantity by removing still wet coating suspension,
 wherein the removal of surplus coating suspension performed in the raw coating step (a) is performed with a pressure and a duration that has been predetermined to yield, on average for the plurality of the carrier bodies coated, an overloaded raw coating comprising a wet coating suspension that is not less than 102% of the target quantity and not more than 105% of the target quantity, the amount of the overloaded raw coating being set to correspond to the sum of the target quantity plus the variation amount of the coating operation,
 wherein the determination of the differential quantity in step (b) involves a determination of the actual quantity of raw coating suspension present on each body comprising weighing each body after coating step (a)(ii),
 wherein reducing step (c) involves reducing the difference between the actual quantity of raw coating and the target quantity comprising application of a pressure or suction at an intensity, a duration, or both an intensity and a duration that is set with reference to the magnitude of the differential quantity, which differential quantity is determined based on the weighing of the body in step (b), in order to reduce the magnitude of the differential quantity of still wet coating suspension on the weighed body,
 wherein the solids of the coating suspension comprises a support material and the liquid medium of the coating suspension comprises water, with the solids having a concentration between 20 and 65 wt.-% based on the total weight of the coating suspension, wherein the removal of still wet coating suspension in step (c) is performed for a duration set within a range between 0.5 and 2 seconds at a pressure set within a range between 50 and 500 millibars, and wherein the removal of still wet coating suspension in step (c) results, on average for the plurality of the carrier bodies coated in the production run, in an excessive final coating that is within 1% of the target quantity.

2. The method according to claim 1, wherein suction is used in step (c) and the intensity, the duration, or both the intensity and the duration of the suction are set corresponding to the measured actual quantity of raw coating based on tabulated data established in preliminary tests prior to the coating operation.

3. The method according to claim 1, wherein suction is used in step (c) and the duration, the intensity, or both the intensity and the duration of the suction are controlled in accordance with:

the values for the actual quantity of raw coating, the duration of suction, and/or the intensity of suction determined for one or more bodies coated prior to the current body; and the associated reduction obtained in the difference between the actual quantity of raw coating and the target quantity in the one or more bodies.

4. The method according to claim 1, wherein the removal of still wet coating suspension is effected by suction or blowing with compressed air.

5. The method according to claim 4, wherein the reduction in the difference between the actual quantity of raw coating and the target quantity in step (c) is performed each time said difference exceeds a previously specified threshold value.

6. The method according to claim 1, wherein steps (b) and (c) are run at least twice until the actual quantity of raw coating is within a previously specified tolerance range above the target quantity.

7. The method according to claim 6, wherein suction during the second run, is applied to an end of the body that is opposite to an end at which suction was applied in a first run.

8. The method according to claim 6, wherein the reduction in the difference between the actual quantity of raw coating and the target quantity in step (c) is performed each time said difference exceeds a previously specified threshold value, with said threshold value reduced after each run.

9. The method according to claim 1, wherein the reduction in the difference between the actual quantity of raw coating and the target quantity in step (c) is repeated until the actual quantity of raw coating corresponds with the target quantity, with the exception that the reduction in step (c) is not repeated despite the actual quantity of raw coating not corresponding with the target quantity when the actual quantity is determined to be below a threshold value that is above the target quantity though which is predetermined to present a risk of yielding an actual quantity of raw coating that is below the target quantity upon the performance of a further reduction.

10. A method for coating a plurality of carrier bodies comprising flow ducts or flow pores, the method comprising, for each carrier body in a production run:

(a) weighing said carrier body to determine the weight of the uncoated carrier body;

(b) delivering a coating suspension to the carrier body;

(c) removing surplus coating suspension from said carrier body by pumping or suction to leave a quantity of wet coating suspension on the carrier body in the form of a raw coating that is present in a quantity greater than a desired target quantity for the carrier body;

(d) weighing said carrier body, after step (c) and prior to any further removal of coating suspension from the carrier body, to determine the weight of said raw coated carrier body;

(e) determining a differential quantity which is the difference between the quantity of raw coating on said carrier body and the desired target quantity of coating on said carrier body; and (f) reducing the difference between the raw coating quantity and the desired target quantity by applying suction or pressure to still wet raw coating on the carrier body at an intensity, a duration, or both an intensity and a duration that is based on the magnitude of the differential quantity determined following weighing of the raw coated carrier body, wherein the delivery step (b) and removal step (c) together yield, on average for the plurality of the carrier bodies coated, an overloaded raw coating comprising a wet coating suspension that is not less than 102% of the target quantity and not more than 105% of the target quantity, the amount of the overloaded raw coating being set to correspond to the sum of the target quantity plus a variation amount of the wet coating quantity applied among carrier bodies coated in the production run coating operation.

11. The method according to claim 10, wherein suction is used in Step (1) and the intensity, the duration, or both the intensity and the duration of the suction are set corresponding to the measured actual quantity of raw coating based on tabulated data established in preliminary tests prior to the coating operation.

12. The method according to claim 10, wherein suction is used in step (1) and the duration, the intensity, or both the intensity and the duration of the suction are controlled in accordance with:

the values for the actual quantity of raw coating, the duration of suction, and/or the intensity of suction determined for one or more bodies coated prior to the current body; and the associated reduction obtained in the difference between the actual quantity of raw coating and the target quantity in the one or more bodies.

13. The method according to claim 10, wherein the removal of still wet coating suspension in step (f) results, on average for the plurality of the carrier bodies coated, in an excessive final coating that is within 1% of the target quantity.

14. The method according to claim 13, wherein the reduction in the difference between actual quantity of raw coating and target quantity in step (1) is performed each time said difference exceeds a previously specified threshold value, and wherein the reduction in the difference between actual quantity of raw coating and target quantity in step (f) is performed such that there results a variation of only +/−0.5% in the final coating amounts of the plurality of finally coated carrier bodies.

15. The method according to claim 10, wherein steps (d), (e) and (f) are run at least twice until the actual quantity of raw coating is within a previously specified tolerance range above the target quantity.

16. The method according to claim 15, wherein suction during the second run, is applied to an end of the body that is opposite to an end at which suction was applied in a first run.

17. The method according to claim 15, wherein the reduction in the difference between actual quantity of raw coating and target quantity in step (f) is performed each time said difference exceeds a previously specified threshold value, with said threshold value reduced after each run.

18. A method for coating a plurality of carrier bodies, comprising flow ducts or flow pores, with at least one coating suspension, wherein the coating suspension comprises solids in a liquid medium, in a quantity in wet state that corresponds to at least a required target quantity, and the coating operation includes a variation in the applied wet coating quantity from one body to the other, the method comprising, for each carrier body in a production run:
- (a) placing a raw coating onto a carrier body at a coating station by
  - (i) delivering a quantity of the coating suspension to the flow ducts or tow pores of the body; and
  - (ii) removing an amount of surplus coating suspension by pumping or suction to leave a quantity of wet coating suspension on the carrier body in the form of a raw coating the raw coating being present in a quantity that is larger than the required target quantity;
- (b) determining, after step (a)(ii) and prior to any further removal of coating suspension from the body, the difference between a quantity of raw coating on the carrier body and the required target quantity for the carrier body comprising weighing the carrier body after a coating step,
- (c) reducing the difference between a weighed quantity of raw coating and the target quantity on that carrier body by removing still wet coating suspension from the weighed carrier body by a suction or pressure application based on the determination made in step (b),
- (d) repeating steps (a) to (c) for each of the plurality of carrier bodies; and
- wherein the raw coating step (a) yields, on average for the plurality of the carrier bodies coated, an overloaded raw coating comprising a wet coating suspension that is not less than 102% of the target quantity and not more than 105% of the target quantity, the amount of the overloaded raw coating being set to correspond to the sum of the target quantity plus the variation amount of the coating operation,
- wherein the solids of the coating suspension comprises a support material and the liquid medium of the coating suspension comprises water, with the solids having a concentration between 20 and 65 wt.-% based on the total weight of the coating suspension,
- wherein for each of the repeated steps (c) in step (d) there is carried out individualized difference reduction removal of still wet coating suspension if the determined difference for a respective carrier body in the production run exceeds a threshold value, wherein each individualized difference reduction removal step comprises an individualized coating suspension removal level adjustment in the suction or pressure application, and
- there is referenced, for each carrier body subjected to a respective individualized difference reduction, data informative of a predetermined association between a required individualized coating suspension removal level adjustment amount for the suction or pressure application that is needed for achieving reduction of the determined difference between the quantity of raw coating on the carrier body and the target quantity for that respective carrier body.

19. The method of claim 18 wherein, for respective carrier bodies within the plurality of carrier bodies, step (c) is carried out multiple times on that respective carrier body until the removal difference is within a predetermined differential of the target value.

20. The method of claim 19 wherein, the repeated steps (c) in step (d), for at least some of the carrier bodies, are undertaken with a stepwise reduction in the predetermined amount of material to be removed in moving toward the target quantity.

21. The method of claim 18 wherein,
- following an initial removal of still wet coating at a first station under (a)(ii), the carrier body is weighed, and then forwarded in a still wet coating condition to a second station wherein step (c) is undertaken, and
- the removal of still wet coating suspension in step (c) is performed for a duration set within a range between 0.5 and 2 seconds at a pressure set within a range between 50 and 500 millibars.

22. The method of claim 18 wherein, the data informative of the predetermined association is derived from,
- a) tables of predetermined association values, or
- b) a reduction amount applicable to a common removal situation from a prior coated carrier body.

23. The method of claim 18 wherein, the difference under step (b) is determined multiple times for individualized carrier bodies and reducing the determined difference with individualized removal adjustments is carried out in a closed-loop control process with a controller in a manner that provides for all of said plurality of carriers to each receive a final coating amount that is within a +/−0.5% variance of one another.

24. The method of claim 18 wherein, for each coated carrier body, following completion of all of steps (a)-(d) there is followed a drying stage application, a calcining stage application, or both a drying stage application and a calcining stage application to the applied coating.

25. The method of claim 18 wherein, the carrier body has flow ducts and the coating is carried out to achieve a coating of all or a portion of a linear length of the flow ducts of the multiple carrier bodies.

* * * * *